(12) United States Patent
Parrott et al.

(10) Patent No.: US 10,475,203 B2
(45) Date of Patent: Nov. 12, 2019

(54) COMPUTER VISION SYSTEM AND METHOD FOR TANK CALIBRATION USING OPTICAL REFERENCE LINE METHOD

(71) Applicant: Saudi Arabian Oil Company, Dhahran (SA)

(72) Inventors: Brian Parrott, Dhahran (SA); Ali Outa, New York, NY (US); Fadl Abdellatif, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/991,507

(22) Filed: May 29, 2018

(65) Prior Publication Data

US 2019/0244382 A1   Aug. 8, 2019

Related U.S. Application Data

(60) Provisional application No. 62/626,878, filed on Feb. 6, 2018.

(51) Int. Cl.
*G01N 21/90*   (2006.01)
*G06T 7/62*    (2017.01)
(Continued)

(52) U.S. Cl.
CPC .............. *G06T 7/62* (2017.01); *G01B 5/0002* (2013.01); *G01B 11/026* (2013.01)

(58) Field of Classification Search
CPC .......... G01F 11/00; G01F 17/00; G01F 23/00; G01F 25/0084; G01F 23/72; G01C 3/08
(Continued)

(56) References Cited

U.S. PATENT DOCUMENTS 4,502,224 A * 3/1985 Davies ................... G01C 15/00
                                                      33/1 V
5,493,903 A * 2/1996 Allen ...................... G01F 22/02
                                                      73/149
(Continued)

FOREIGN PATENT DOCUMENTS

JP    H10221077 A   8/1998
WO    0138823 A1    5/2001

OTHER PUBLICATIONS

International Search Report and Written Opinion in corresponding PCT Application No. PCT/US2019/015744, dated Apr. 24, 2019.

*Primary Examiner* — Hoa Q Pham
(74) *Attorney, Agent, or Firm* — Leason Ellis LLP

(57) ABSTRACT

Systems and methods are disclosed for measuring the dimensions of storage tanks using Optical Reference Line Method calibration techniques. The system utilizes a camera mounted near the tank wall such that its optical axis defines a reference line extending parallel to the wall and a robotic vehicle for moving a target object along the surface of the tank. Specifically, the target includes a predefined measurement scale that can be imaged by the camera as it is moved along the wall. A computer implementing computer-vision algorithms analyzes images of the scale captured at respective elevations to determine the point on the scale intersected by the reference line and a corresponding offset distance between the wall and the reference line. Accordingly, the dimensions of the tank are calculated by the computer based on the offset distance calculated for respective elevations of the tank wall.

19 Claims, 9 Drawing Sheets

(51) Int. Cl.
*G01B 5/00* (2006.01)
*G01B 11/02* (2006.01)

(58) Field of Classification Search
USPC .................... 356/625–640, 601–623; 73/149
See application file for complete search history.

(56) References Cited

U.S. PATENT DOCUMENTS

| | | | |
|---|---|---|---|
| 8,214,081 B2* | 7/2012 | Choi | G01S 1/54 |
| | | | 700/250 |
| 9,188,472 B2* | 11/2015 | Hassell, Jr. | G01F 17/00 |
| 2010/0085437 A1 | 4/2010 | Troy et al. | |
| 2014/0345375 A1 | 11/2014 | Hassell, Jr. | |
| 2019/0011304 A1* | 1/2019 | Cunningham | G01F 17/00 |

* cited by examiner

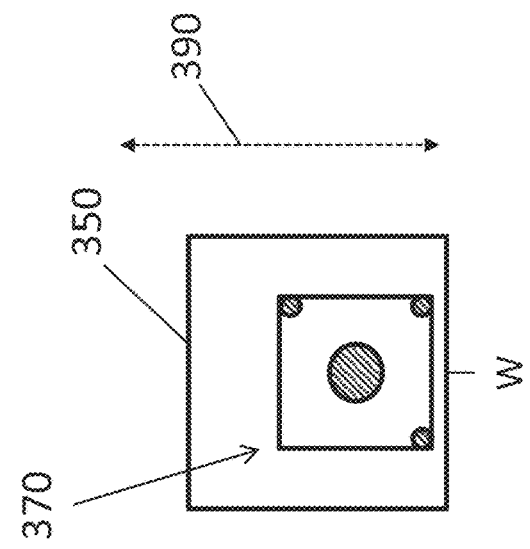
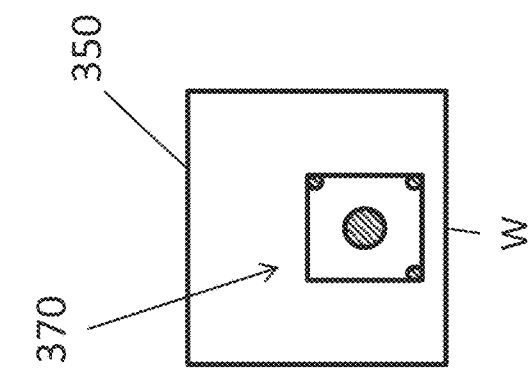
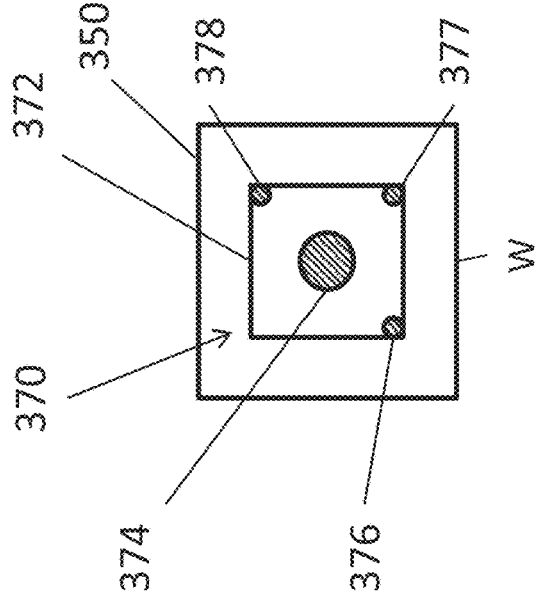

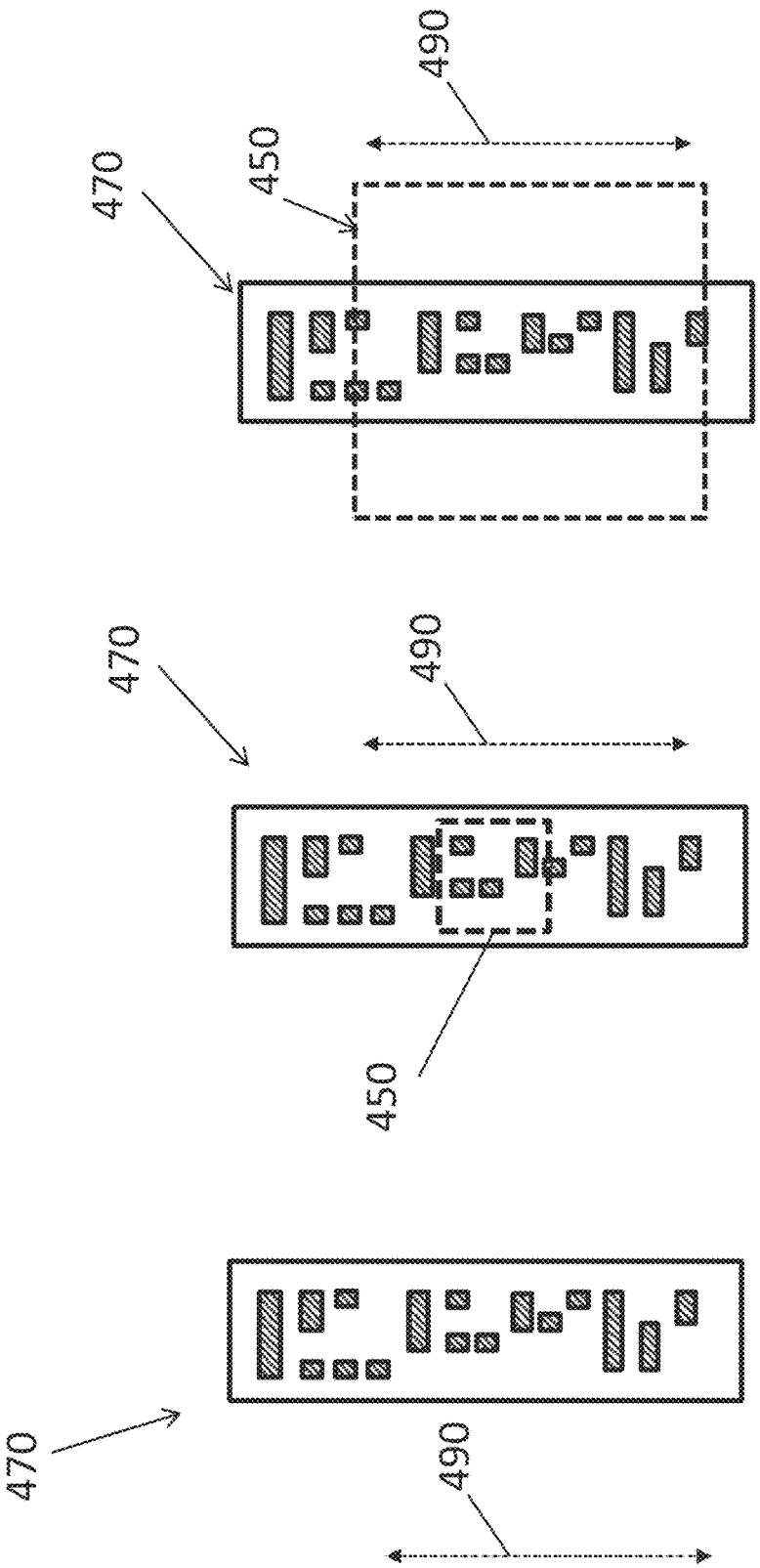

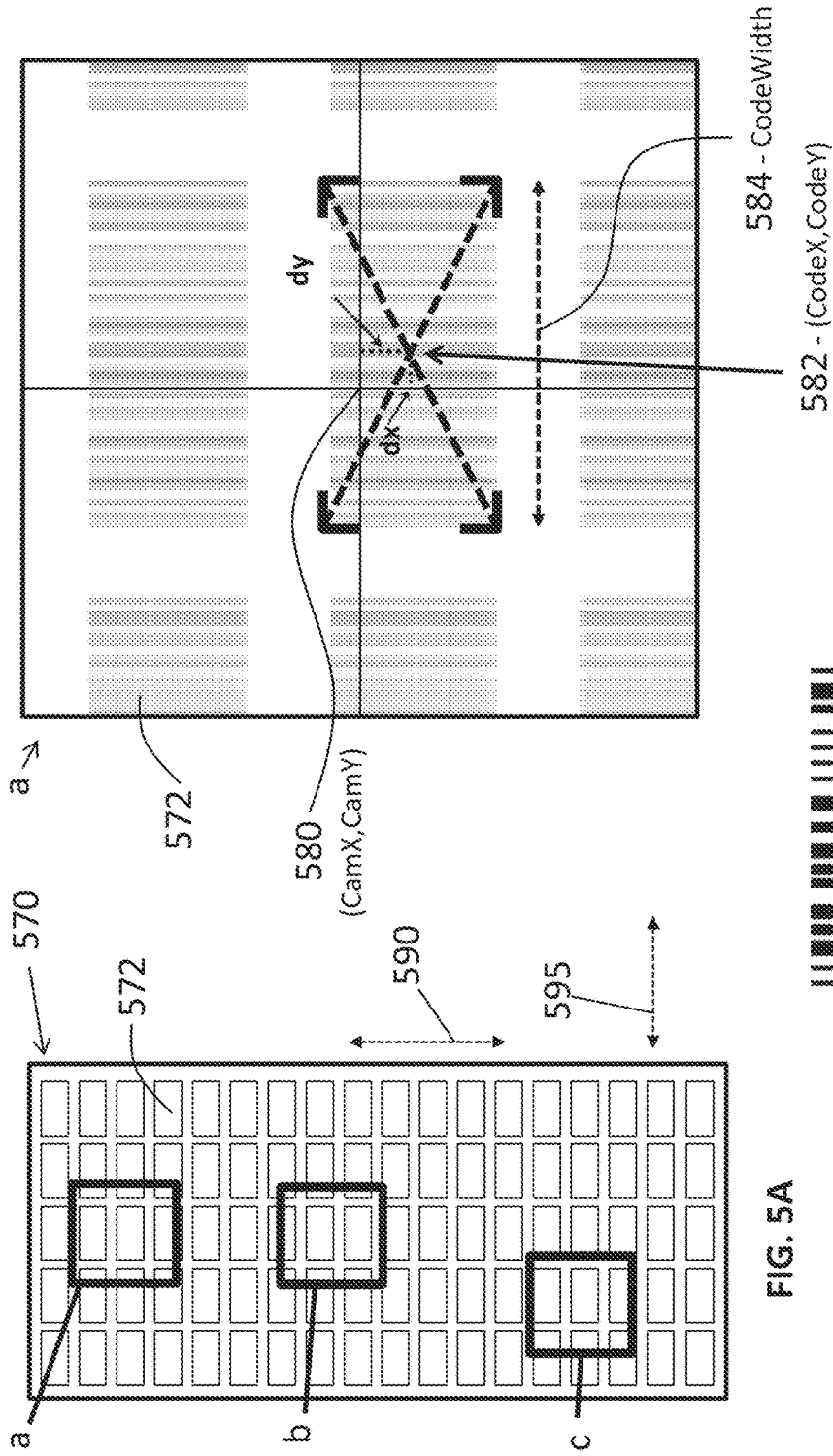

COMPUTER VISION SYSTEM AND METHOD FOR TANK CALIBRATION USING OPTICAL REFERENCE LINE METHOD

FIELD OF THE INVENTION

The present technology relates to calibration of storage tanks. In particular, the present technology relates to calibration of storage tanks by measuring the horizontal offset of the wall of a tank relative to a reference using computer vision techniques for performing optical reference line measurements.

BACKGROUND

In the oil and gas industry the storage tanks for crude and refined products play a key part in the supply chain of hydrocarbons. Knowing the exact volume of these storage units plays a critical role when transferring products to and/or from the tanks. As a result of variations in external and internal conditions (i.e. temperature) and aging and also as a result of the weight of the liquid product (i.e. hydrostatic pressure), the tank volume can vary by as much as +/−0.2%. Considering a 250,000 barrel storage tank, this variation would result in a volume of +/−500 barrels in volume change.

As a result of the high value of petroleum hydrocarbons, there is a mandatory requirement for calibration of storage tanks. Tanks used for custody transfer must be calibrated such that the transferred volume is very accurately known (e.g., Less than 0.1% error). The most commonly used techniques to perform this are; manual strapping (API MPMS 2.2 A), optical techniques (Optical Reference Line Method ORLM—API Chapter 2.2B, Optical Triangulation Method (OTM)—API Chapter 2.2C, Electro-Optical Distance Ranging Method (EODR)—API Chapter 2.2D) and liquid calibrations (API Standard 2555). However, there are concerns with the effectiveness of these measurements in meeting the desired accuracy levels. In some cases, the foregoing testing techniques require tank downtime (e.g., emptying of the tank or otherwise halting the tank operation temporarily), which accumulates additional costs to the losses incurred. Moreover, many of the foregoing testing techniques are invasive in that they require accessing the internal volume of the tank and also can be destructive.

The existing methods for tank calibration present significant drawbacks. For instance, using the current standards, it can take 1-2 days of work to perform the calibration. Additionally, many of these methods pose safety risks for the workers performing the calibration process. As a result, calibration of storage tanks is performed infrequently thus leading to inaccurate measurements of the actual volume stored within the tank or transferred to and from the tank, which can be costly. For example, a traditional timeframe between calibrations can be between five and fifteen years.

What is needed are systems and methods for calibrating the volume of storage tanks that addresses the limitations associated with the efficiency of performing calibration using existing systems. More specifically, what is needed are systems and methods for accurately performing tank calibration that can be deployed and operated in a relatively quick, low-cost, and non-invasive manner. What is also needed is a system that can be deployed quickly and on-demand and thus facilitates highly accurate detection of changes in tank volume on a more frequent basis (e.g., on a daily basis or even per-fill basis).

It is with respect to these and other considerations that the disclosure made herein is presented.

SUMMARY OF THE INVENTION

According to a first aspect of the present disclosure, a system for measuring the volume of a tank is disclosed. The system comprises a camera having an optical sensor and, with the camera being positioned such that the camera's optical axis is parallel to a surface of the tank and thereby defines an optical reference line extending parallel to the surface of the tank. The system further comprises a robotic vehicle that is selectively moveable along the surface of the tank and configured to be remotely controlled by an operator. In addition, the system further comprises a reference object that is supported by the robotic vehicle. The reference object has a standardized measurement scale that is provided on a surface thereof and that faces the camera. The system also includes a data processor that communicates with the camera and receives images of the measurement scale captured by the camera at respective elevations on the tank. In particular, the data processor comprises a processor and a computer readable non-transitory storage medium storing executable instructions in the form of one or more software modules. Furthermore, the software modules, when executed by the processor, configure the processor to determine, from the measurement scale depicted in the images, positions of the reference object relative to the optical reference line as the robotic vehicle moves along the surface of the tank. The software modules also configure the processor to calculate the volume of at least a portion of the tank based at least partially on the determined positions.

According to another aspect of the present disclosure, a method for measuring the volume of a tank is disclosed. The method comprises the step of providing a camera, wherein the camera's optical axis is parallel to a surface of the tank and thereby defines an optical reference line extending parallel to the surface of the tank. The method also includes urging a robotic vehicle along a surface of the tank. In particular, the robotic vehicle comprises a reference object having a standardized measurement scale provided on a surface of the reference object and facing the camera. In addition, the method includes capturing images of the measurement scale as the robotic vehicle is moved along the surface of the tank using the camera. The method also includes the step of monitoring changes of position of where the reference line intersects the standardized measurement scale. More specifically, the monitoring step is performed using a data processor that communicates with the camera and receives the images, wherein the data processor comprises a computer readable non-transitory storage medium having executable instructions stored therein and a processor that is configured by executing the instructions.

These and other aspects, features, and advantages can be appreciated from the accompanying description of certain embodiments of the invention and the accompanying drawing figures and claims.

BRIEF DESCRIPTION OF THE DRAWINGS

FIG. 3A is a conceptual image illustrating an exemplary configuration of a reference object having standardized measurement markings in accordance with one or more embodiments of the invention;

FIG. 3B is an exemplary conceptual image illustrating the reference object of FIG. 3A in accordance with one or more embodiments of the invention;

FIG. 3C is an exemplary conceptual image illustrating the reference object of FIG. 3A in accordance with one or more embodiments of the invention;

FIG. 4A illustrates an exemplary configuration of a reference object having standardized measurement markings in accordance with one or more embodiments of the invention;

FIG. 4B illustrates the reference object of FIG. 4A and illustrates an exemplary area of the reference object captured using a camera in accordance with one or more embodiments of the invention;

FIG. 4C illustrates the reference object of FIG. 4A and illustrates an exemplary area of the reference object captured using a camera in accordance with one or more embodiments of the invention;

FIG. 5A illustrates an exemplary configuration of a reference object having standardized measurement markings in accordance with one or more embodiments of the invention;

FIG. 5B illustrates a portion of the reference object of FIG. 5A captured and measured in accordance with one or more embodiments of the invention;

FIG. 5C illustrates an exemplary bar code of the reference object of FIG. 5A;

DETAILED DESCRIPTION OF CERTAIN EMBODIMENTS OF THE INVENTION

By way of overview and introduction, a system and method is disclosed for measuring and determining the dimensions of large petroleum storage tanks so as to calculate the volume of such tanks using Optical Reference Line Method ORLM inspection techniques. More specifically, the systems and method disclosed herein implement computer vision to measure offsets during ORLM calibrations of storage tanks.

ORLM provides for the calibration of cylindrical tanks by measurement of one reference circumference, followed by determining the remaining circumferences at different elevation levels on the tank. The remaining circumferences are determined by measuring the horizontal offset of the tank wall from a vertical optical reference line. These circumferences are corrected, based on wall thickness, to calculate true internal circumferences, which can then be added to determine the tank volume.

Figure 1:
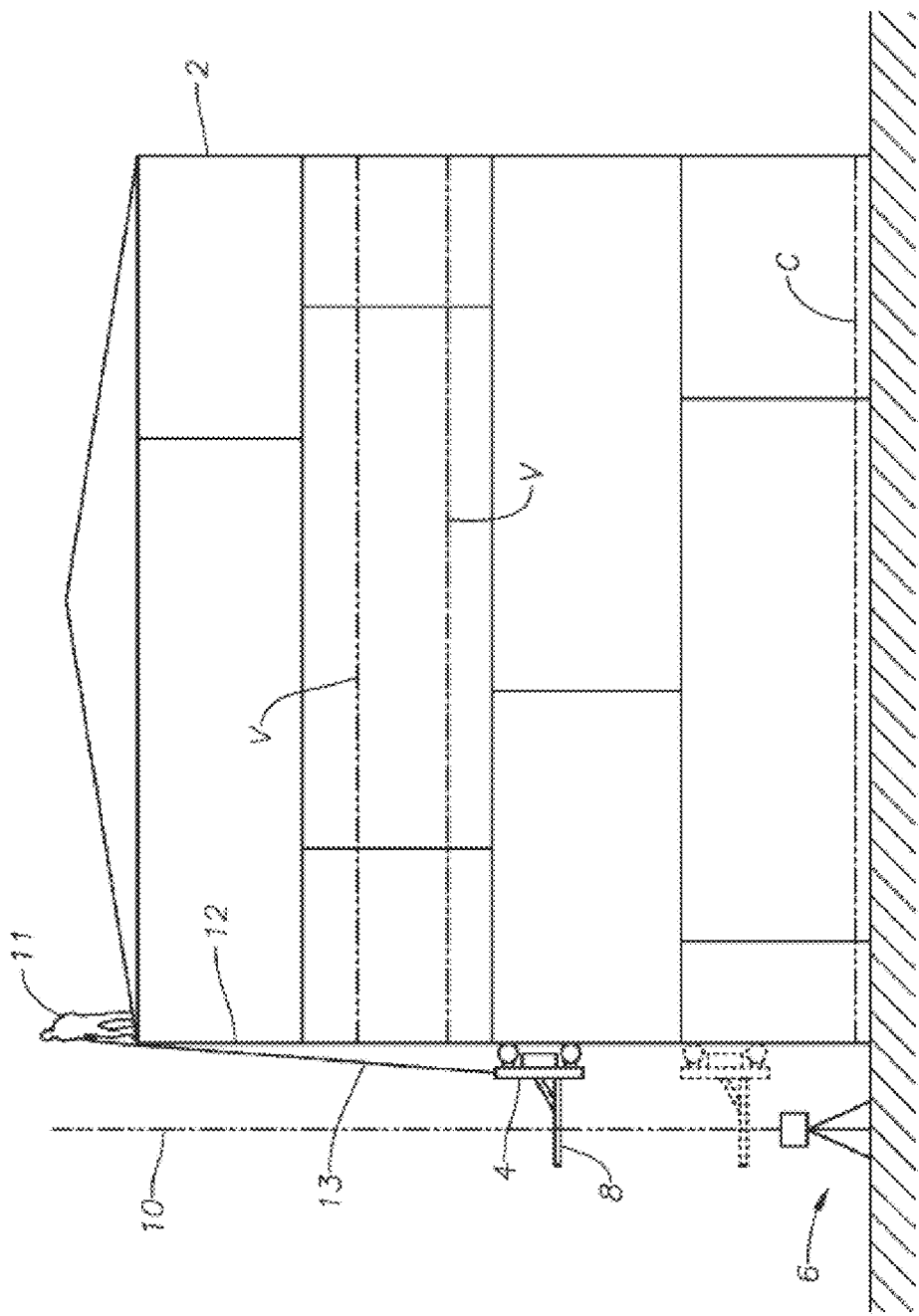
FIG. 1 is a schematic side view of a known system for carrying out the optical reference line method of tank calibration.

An example of the ORLM method is shown in FIG. 1, in which there is shown a tank 2, a magnetic trolley 4, an optical device 6, and a horizontal graduated scale 8 attached to the trolley 4. The optical device 6 produced an optical ray of light 10 upwardly and parallel to the tank wall 12. The magnetic trolley 4 is typically controlled by an operator 11 positioned on top of the tank 2, that holds a rope 13 attached to the trolley. The operator 11 raises and lowers the trolley 4 on the tank wall 12 by manipulating the rope 13.

To measure the volume of the tank 2, a reference circumference C is first measured. The reference circumference is measured using a master tape (not shown), and is typically measured near the bottom of the tank 2. With the reference circumference known, the trolley 4 can be raised or lowered by the rope 13 to various vertical stations, or predetermined locations, along the tank wall 12. In most systems, the vertical stations are located between the weld seams on the tank. In FIG. 1, two of the vertical stations are indicated by lines V. At each vertical station V, the horizontal offset between the tank wall 12 and the optical ray of light 10 is noted, using the horizontal graduated scale 8. Once a series of measurements have been taken at the vertical stations V, the measurements are repeated with the optical device 6 rotated 180 degrees to verify accuracy. Thereafter the measurements are used to determine the circumference of the tank at each vertical station (using the reference circumference as a reference point), and the volume of the tank can be estimated. Additional factors can also be considered when calculating volume, such as, for example, the temperature of the tank wall 12. This temperature is typically derived based on the temperature inside the tank and the ambient temperature.

While the ORLM method shown in FIG. 1 is better in some ways than filling the tank and metering the fluid, as discussed above, it still has significant problems. For example, measuring the horizontal offset of the trolley 4 from the optical ray 10 at only a few select vertical stations V provides relatively few data points from which tank circumferences can be measured. Although this data can be extrapolated to estimate the volume of the tank, such extrapolations may not always be accurate. In addition, the method of FIG. 1 requires the operator 11 to be positioned on the top of the tank, which can be dangerous. Furthermore, the use of an optical ray 10 and a horizontal graduated scale 8 to measure the horizontal offset of the tank wall 12 lacks the precision necessary to calculate accurate tank volumes. This is because an operator must read the horizontal graduated scale 8 at each horizontal offset, often from a distance. This approach also requires significant time in comparison to an automatic sensor system.

Exemplary systems and methods for measuring the volume of a tank using laser-based ORLM techniques are further described in commonly assigned U.S. Pat. No. 9,188,472, to Hassell, entitled "Enhanced reference line tank calibration method and apparatus," filed May 21, 2013, which is hereby incorporated by reference as if set forth herein in its entirety.

Figure 2:
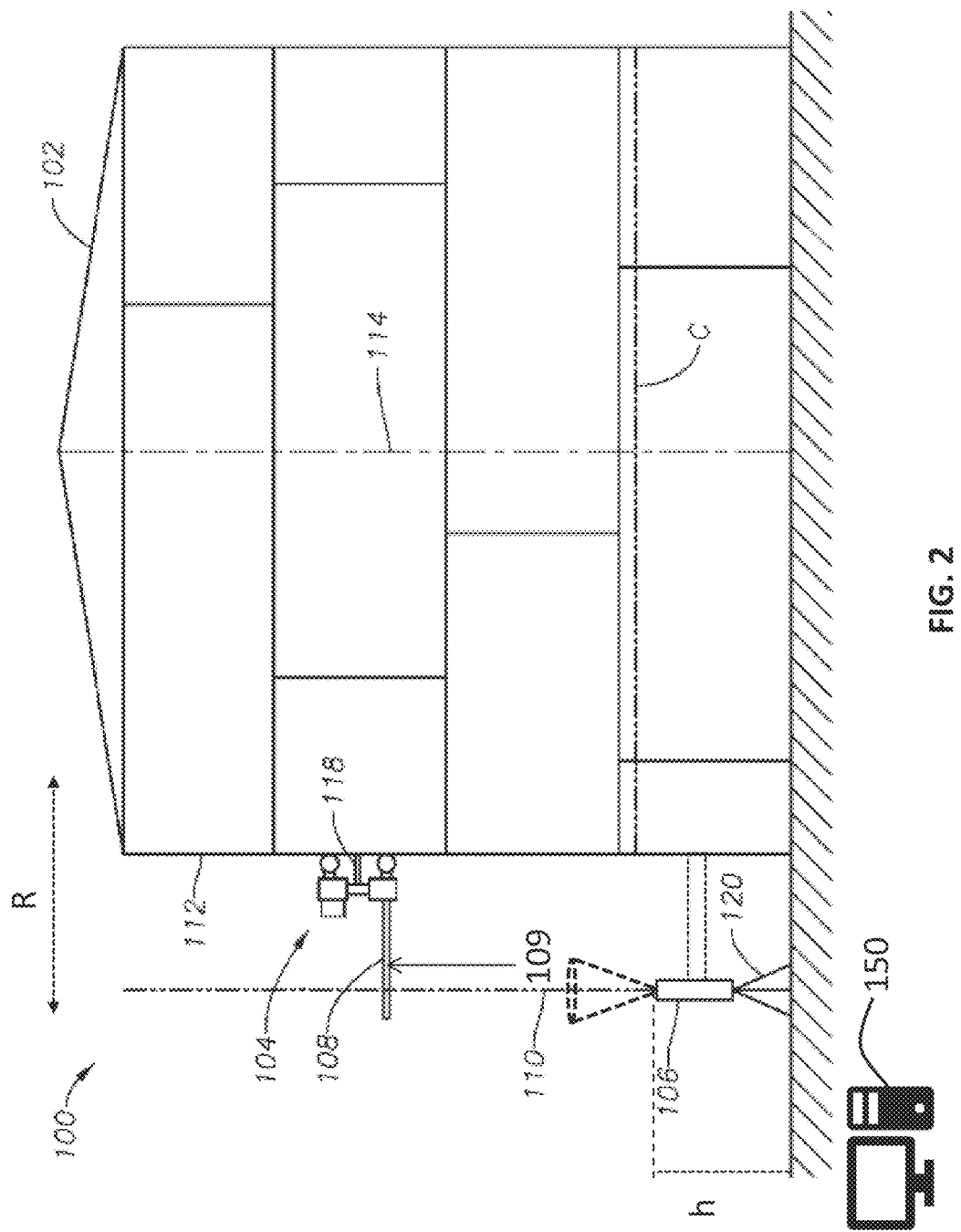
FIG. 2 is a high-level diagram illustrating an exemplary container volume calibration system using optical reference line method according to an embodiment of the invention.

According to a salient aspect, the systems and method further described herein utilize computer vision methods and algorithms to measure offsets during ORLM calibrations of storage tanks. FIG. 2 is a schematic representation of a computer-vision-based system 100 for measuring the volume of a tank that includes a tank 102, a camera device 106 and a robotic vehicle 104. The camera and the robotic vehicle can also be in data-communication with a computing system 150 (connection means not shown) which is configured to coordinate the operation of the system 100, the various devices including the camera and robotic vehicle.

Figure 8:
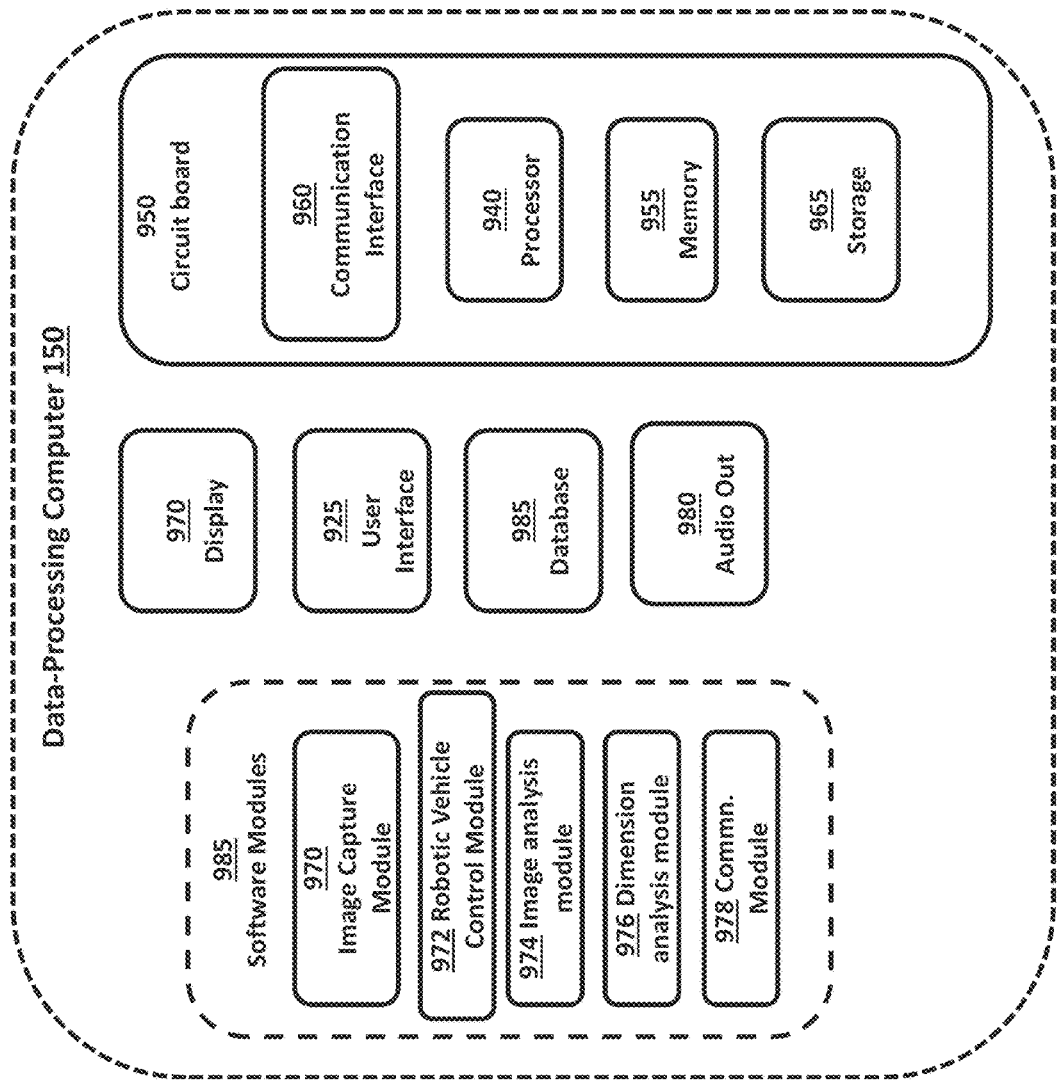
FIG. 8 is a block diagram illustrating exemplary hardware and software components of an exemplary data processing computer according to an embodiment of the present invention.

As further described in relation to FIG. 8, the computing system 150 can comprise one or more processors (not shown), which execute one or more software modules in the form of machine implementable code and, in doing so, is configured to coordinate the measurement operations using the camera and robotic vehicle 104 connected thereto. In addition, the software configures the diagnostic system to analyze the information collected using the camera (e.g., imagery) and the robotic vehicle (e.g., height and/or position on the wall) and calculate various dimensions of the container (i.e., the container's geometry).

As shown in FIG. 2, the camera 106 is mounted proximate to the surface of the tank at a "reference station" at height h. To measure the volume of the tank 102, the circumference C of the tank 102 is preferably first measured at the predetermined reference location using any appropriate method. For example, in FIG. 2, the reference circumference is determined by measuring the horizontal distance around the circumference of the tank 102 along line C. Using the circumference measurement at the reference location, the ring radius of the tank at the reference location can be determined using the series of equations specified in API MPMS Chapter 2.2A Appendix B to correct for the necessary adjustments to the simple geometric relationship of $r=c/2\pi$, where r is the radius, and c is the circumference of the tank.

In addition, in such applications for measuring the offset of vertical tank walls, the camera 106 is preferably mounted such that the camera sensor is facing upwardly (e.g., in the direction of gravity and generally parallel to the tank wall, assuming that the tank is on level ground). Furthermore, the field of view of the camera is centered on the camera's optical axis, which defines the reference line 110, and the camera is preferably mounted such that reference line is substantially parallel to the wall 112 of the tank 102. As shown in FIG. 2 the optical axis/reference line 100 is oriented in the vertical direction and as such is also referred to herein as a vertical reference line. For clarity, the term "field of view," is used herein to refer to the scene that can be captured by the camera.

As shown in FIG. 2, the camera can be mounted to the surface of the tank. in addition or alternatively, the camera can be positioned away from the wall, by means of a tripod 120 or equivalent supporting device with leveling features along three different axes. In addition, the distance from the tank wall 112 to the optical sensor of camera 110 can be measured at the reference location. Because the ring radius of the tank at the reference location is known, and the distance from the tank wall 112 to the reference line 110 is known, the distance from the center 114 of the tank 102 to the reference line 110 can be calculated. Deducting the tank wall thickness determined either directly or from engineering drawings, the internal tank ring radius can be determined.

The robotic vehicle 104 is preferably configured to move along the surface of the tank in the vertical direction V, as shown in FIG. 2. As shown, the vehicle can be configured to remain in contact with the wall 112 and support a reference object 108. Preferably, the reference object extends outwardly away from the tank wall 112 in the radial direction R, which is normal to the surface of the tank and orthogonal to the viewing direction of the camera, at least far enough such that the bottom surface 109 of the object 108 intersects the vertical reference line 110 and faces the camera. The robotic vehicle can be computer controlled and/or manually controlled such that it climbs the tank in the vertical direction while, preferably, staying aligned with the camera 106 in the horizontal direction (not shown), which extends perpendicular to both the radial and vertical directions.

The bottom surface 109 of the reference object 108 can include a machine readable measurement scale, also referred to as a "ruler" or "digital ruler" or "target" 170 (not shown) that, as further described herein, can be imaged using the camera 106 and the imagery can be analyzed to determine the radial position of the scale relative to the vertical reference line 110. More specifically, an image of the scale captured at a given height on the wall can be analyzed to determine the location on the scale that intersects with the reference line 110. Accordingly, using the so determined location on the scale and the known position of the readable measurement scale relative to the tank wall 112, which is known from the physical configuration of the robotic vehicle, the offset distance between the vertical reference line 110 and the tank wall 112 can be determined. As the robotic vehicle 104 moves vertically up and down the tank wall 112, the curvature of the tank wall 112 toward or away from the vertical reference line 110 can be measured. Thus, the distance between the vertical reference line 110 and the tank wall 112 can be measured at any given elevation based on the imagery captured using the camera at respective elevations.

In some embodiments, the camera 106 can be configured to communicate with a computing device 150 that can be configured to receive the imagery captured while the reference object 108 is at respective heights on the wall 112 and uses the imagery to determine the contour of the tank wall 112 relative to the vertical reference line 110. Similarly, the robotic vehicle 104 can also be in data-communication with the computing device 150 so as to provide additional information that might inform the calibration calculations, including without limitation, a vertical height and other positional measurements measured by sensors on-board the robotic vehicle, as would be understood by those in the art. Direct communication between the camera 106 and the computing device 150 is advantageous because it greatly increases the number of measurement points used for determining the contour of the tank wall and also removes or reduces error that can be associated with human readings of an analog position indicator, such as those typically used in known systems. In addition, the computing device 150 can be configured to repeat the measurement automatically for imagery captured at different heights. After the first vertical station is completed the above process can be repeated at the required number of locations around the tank.

Because the distance from the vertical reference line 110 to the center 114 of the tank 102 is known, as described above, the radius of the tank at any given elevation can be determined based on the offset determined using the image of the readable scale captured by the camera. This in turn means that the circumference of the tank at any given elevation can be determined using the formula $c=2\pi r$, where c is the circumference, and r is the radius. Finally, the volume of the tank can be measured using the circumference calculations at any number of desired elevations along the height of the tank wall 112, or optimally integrated into a continual profile of the tank wall at each vertical location. Each of these calculations can be carried out by the computing device 150. This allows measurement and analysis of up to thousands of data points along the tank wall 112, rather than the few measured points in known systems. This increase in measurement sensitivity, and the number of data points collected during the measurement process, leads to more accurate volume calculations during tank calibration. In addition, the system 100 of the present technology reduces the time required to calculate the volume of a tank 102 because the data can be collected and analyzed electronically in real-time.

Figure 9:
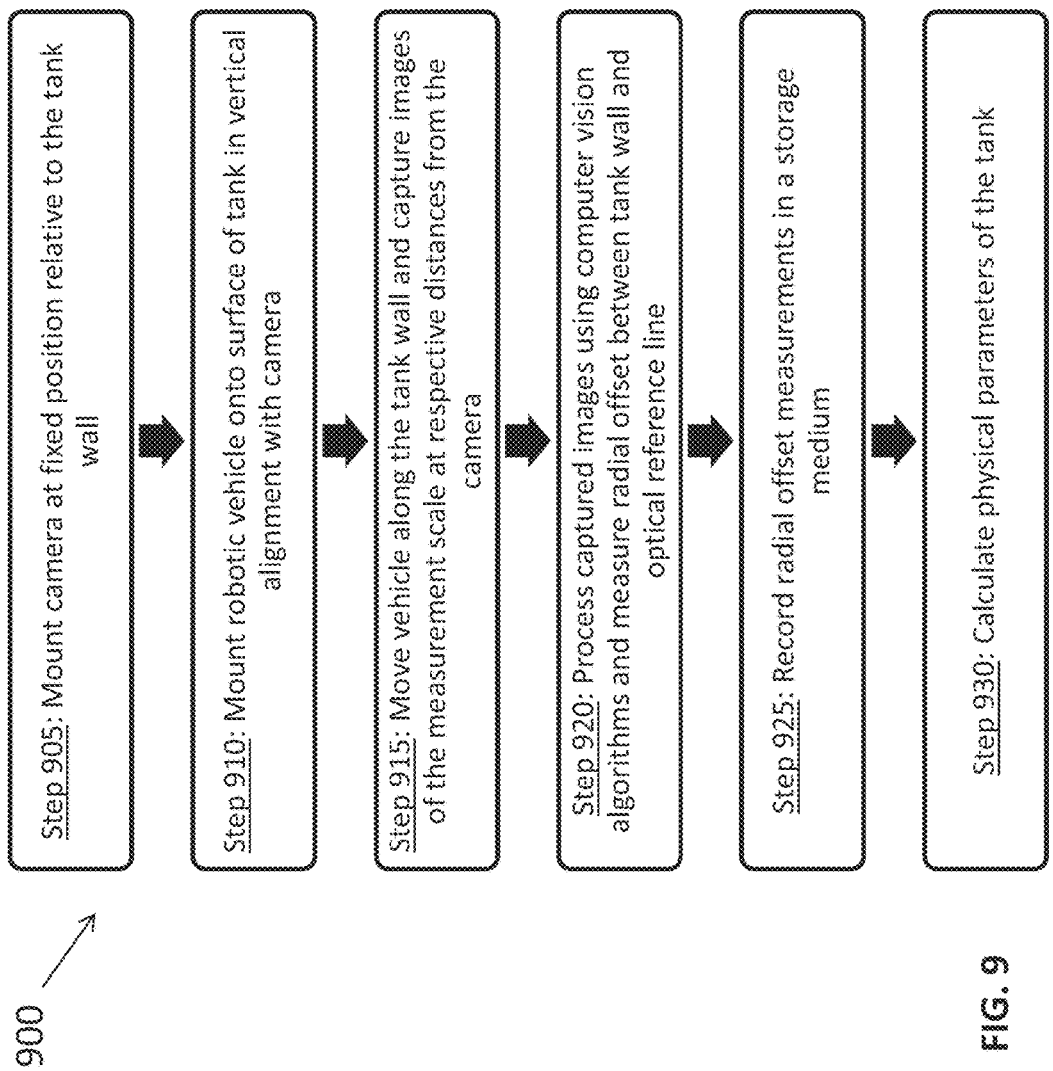
FIG. 9 is a process flow diagram for an exemplary method for measuring radial offset of a tank wall according to an embodiment of the invention.

To recapitulate, and as shown in FIG. 9, the method 900 for measuring radial offset of a tank wall relative to a known position can include:

Step 905. Mounting a camera 106 to the wall 112 of the tank 102 in a vertical position (with the camera sensor facing in the direction of gravity).

Step 910. Mounting a robotic vehicle 104 with a reference object comprising a "digital ruler" onto the surface of the tank directly above the camera so that the "ruler" is facing towards the camera and extending outwards, normal to the surface of the tank Step 915. Moving the vehicle up the side of the tank, capturing images of the ruler using the camera at respective distances from the camera.

Step 920. Processing the captured images with the computing device 150 using computer vision algorithms to determine the relative movement of the ruler within the camera's field of view and, thus, the change in offset distance between the reference line 110 with respect to the wall 112 of the tank 102 in the radial direction R, which is normal to the surface of the tank (orthogonal to the view of the camera).

Step 925. Recording these radial offset measurements, by the computing device in a storage medium, wherein the measurements are associated with a respectively measured distance between the ruler and the camera or the height of the vehicle on the wall 112 of the tank.

Step 930. Calculating physical parameters of the tank, wherein the calculated physical parameters can include, for example, the contour of the tank wall, the radius and/or circumference of the tank at given heights on the wall and the tank volume.

According to a salient aspect, the disclosed embodiments implement various approaches for using computer vision to measure offsets during ORLM calibrations of storage tanks. The techniques rely upon the use of computer vision to digitally measure offsets using a specially designed ruler as a vehicle carries the ruler vertically up the side of a tank relative to the camera provided at an inspection station. According to one exemplary approach, the camera and the associated data processing computer, which is executing computer vision software, utilizes the camera's optical zoom to track the robot as it moves away. In another exemplary approach, the use of zoom is optional and the computer instead monitors relative change in offset based on patterning with high spatial accuracy.

In some implementations, the camera 106 can be configured to continually zoom on the measurement scale or "target" 170 (without changing orientation) and measures the movement of markings of the target (e.g., a central circle) relative to the field of view of the camera, more particularly, relative to the central optical axis also referred to as the reference line 110. For example, the camera, being controlled by an associated optical lens control algorithm, can be configured to automatically adjust the zoom of the camera as the target moves towards or away from the camera such that an outer boundary of the target maintains a particular size in relation to the field of view (e.g., a consistent width). Accordingly, the optics settings relating to the zoom and height of the robot can be accounted for in the data processing calculation that converts the measured movement of the marking within one or more images relative to a reference position to an actual offset distance.

In some implementations, a ruler is marked with a pattern that is locally unique along the full length of the ruler. In other words, the marker objects can be unique and individually identifiable and be provided at a local area on the surface of the target object that is known. By way of further example, unique combinations of marker objects can be used to uniquely identify a given local area on the surface of the target. The camera might or might not be configured zoom, but the computer vision system (i.e., the computing device 150 implementing various computer-vision processing algorithms) can be configured to determine the center pixel's location with respect to the markings to determine the exact offset at each measurement location.

It should be understood that different camera optics can be used to mitigate optical distortion and minimize the need for zoom over various distances. Furthermore, zoom requirements can be calculated for a given application based on, for example, sensor resolution, size, focal length, object size and resolution required at a given distance. More specifically, if we assume, for example, that a height of 2 pixels is necessary for recognizing an object, the formula for determining resolution at a distance (given focal length, size of sensor and sensor vertical resolution) is:

$$\text{Measurement Resolution} = \frac{2 * \text{Size of Sensor}}{\text{Sensor Vertical Resolution}} * \frac{\text{Distance}}{\text{Focal Length}}$$

If using a lens that has a scope-like characteristic (where only light that is parallel enters the lens) such that the object observed at any distance is 'seen' as the same size. In this case, the angle of view is 0 (e.g., the defining edges of the field of view are parallel). In that situation, zoom is not needed and the measurement resolution equation becomes simpler as the distance*focal length term becomes a constant related to the width of observation. In some applications, the computer vision system may be able to detect less than 2 pixel changes due to the analog data in each pixel (achieving sub-pixel accuracy).

FIGS. 3A-3C depict conceptual "images" of an exemplary measurement scale 370 captured at various positions relative to the field of view 350 of the camera. In particular, the measurement scale comprises discernible markings including an outer boundary 372, a central circle 374, and corner circles 376, 377 and 378 (bottom left, bottom right and top right, respectively).

The image shown in FIG. 3A is an exemplary image captured by the camera during initial set-up of the system, e.g., before moving the vehicle up the wall 112. During set-up, the computing device 150, which is configured to analyze the imagery captured by the camera 106 using machine vision algorithms, can be configured to perform one or more steps directed to calibration and determining references that inform the offset calculation from subsequently captured imagery. The calibration steps can include: a) measuring the width of the target, say, how many pixels there are between the two small circles 376 and 377, b) recording the position of the center of the middle circle 374 relative to a defined reference, say, the camera's optical axis, and also c) measuring the height of the target, say, how many pixels there are between the two small circles 377 and 378. Calibration can also include determining the aspect ratio for the target, for example, based on the relative dimensions or one or more portions of the imaged target, as would be understood by those in the art.

The image shown in FIG. 3B illustrates how, for example, as the robot moves up the wall 112 away from the camera, the target 370 becomes smaller and might start shifting in the up or down direction (shown by arrow 390) within the field of view 350 due to the change in offset between the tank wall and the reference line (e.g., changes in the profile of the tank wall in the normal direction shown by arrow 390 in FIG. 3C). For clarity, the side of the field of view labeled W in FIGS. 3A-3C represents the side that is closest to the wall.

The image shown in FIG. 3C further illustrates how optical zoom can be used to measure the offset. In particular, the system can be configured to analyze real-time imagery of the target 370 and controllably zoom the camera in (e.g., using an optical zoom) until the distance between two reference points (e.g., the number of pixels between the two small circles 376 and 377) measured from the real-time imagery matches the width of the same reference points measured during calibration.

Thereafter, the system can be configured to record the pixel location of the center of the target, for instance the center of the middle circle 375 and, as mentioned above, translate it into a measured distance offset from its original location as determined during calibration from the image shown in FIG. 3A. In addition, the system can be configured to measure the height of the target and obtain the aspect ratio of the target to adjust the calculation for the middle circle location and thereby converting the measured movement of the marking within one or more images relative to a reference position to an actual offset distance.

FIG. 4A depicts an exemplary measurement scale 470. FIGS. 4B and 4C further depict the measurements scale 470 and conceptual "imagery" of the exemplary measurement scale 470 taken at various stages of an exemplary method for performing ORLM using computer vision. In particular, FIG. 4A depicts a measurement scale 470 comprising a digital ruler. As shown, the ruler includes a unique (in this case binary encoding) arrangement of shapes that enables the camera and computer vision system to recognize unique positions on the ruler, which are known to correlate directly to a respective offset (distance). The positions of the shapes are known to correlate to a respective offset based on the known configuration of the measurement scale (e.g., size, shape, arrangement of shapes and respective position relative to an origin) and the known configuration of the robot that the target object and measurement scale is attached to (e.g., the known distance between the wall and the ruler when the robot is deployed on the wall). As shown, the shapes are primarily arranged in the direction 490, which is normal to the tank wall when the system is deployed, thereby allowing for the calculation of offset distance in the direction 490.

Depending on the application, multiple patterns can be adopted, including integrated patterns that provide higher resolution markings if higher accuracy is desired through the use of more highly zoomed cameras. Accordingly, based on the known pattern of markings, the system can be configured to measure the offset of the tank in a normal direction 490 for a given height of the scale on the tank wall based on the location of the digital ruler within the field of view 450.

As highlighted in FIG. 4B, during image analysis of imagery captured at relatively short distances between camera and target, the camera and, more specifically the computer vision system, will see only a small portion of the ruler within the field of view encompassed by the box 450. Accordingly, it is preferable that the camera be able to see the entire width of the ruler and at least two markings in order to determine the unique location on the target that it is focused on.

For example, the computer vision system can use a centroids finding algorithm to find the center of each box in the normal direction 490 and separately measure the width and the pattern they form to determine which position the box(es) it is measuring correspond to on the digital ruler based on the known pattern configuration of the digital ruler. The computer vision system can then be configured to determine what offset measurement corresponds to the center pixel of the camera image based on the measured position of one or more box(es) relative to the center pixel and the known position of the box(es) on the ruler.

FIG. 4C further illustrates an approach to computing measurements over distances. More specifically, as the distance increases between the camera and the ruler 470, the field of view 450 captured within an image will get larger. However, the image analysis can be performed in the same manner described above. Furthermore, resolution will decrease as the ruler moves further away and, at some distance, it can be necessary to change the zoom parameter of the camera. However, since the ruler itself defines the reference distances, as long as the camera remains centered on the same optical axis/reference line, zoom adjustment should not interfere with the calculation of the offset and the tank calibration.

Although the foregoing exemplary embodiments are primarily directed to measuring offset in one direction, namely, in the normal direction relative to the tank wall, the measurement scale and methods for performing ORLM using computer vision can be implemented to detect drift in a horizontal direction as well, which is perpendicular to the normal direction in the two-dimensional plane of the target's surface having the measurement scale thereon and facing the camera.

FIG. 5A depicts an exemplary measurement scale 570 configured to enable measurement of horizontal drift in addition to drift in the normal direction and conceptual "imagery" of the camera's field of view of the scale at respective heights on the tank wall. FIG. 5C depicts a close-up view of an area "a" of the measurement scale 570 captured by the camera. More specifically, the scale 570 comprises multiple columns of unique markers 572 that are distinguishable from one another (represented here by barcodes but they could be any unique shape). FIG. 5C illustrates an exemplary bar code 572, as would be understood by those in the art. By using a scale comprising multiple columns of unique markers 572 the system can be configured detect not only vertical drift (in the normal direction 590 relative to the wall) but also horizontal drift (in a perpendicular direction 595 to the normal direction). Preferably, the camera and computer vision system can be configured to utilize the camera's optical zoom to ensure that at least one marker is within the field of view as the scale is moved away or toward the camera. Accordingly, the system can be configured to detect the relative position of the camera with respect to the measurement scale or "marker plate" (both in x and y direction).

The squares identified as a, b and c in FIG. 5A represent the field view of the camera at three (3) different instances. Area a) for example, represents the field of view captured at the initial position of the marker plate, for instance, during system set-up and calibration. Area b) represents the captured field of view in a case where, for example, the marker plate drifts upward (or camera drifts downward) in the direction 590 as a result of the robotic vehicle being positioned at a different location on the wall. Due to the different unique marker that is present in this area b), the system can detect the vertical offset between the cases a) and b) based on the known relative position of areas a) and b). Area c) represents an instance in which the plate drifts in both x and y directions (i.e., horizontal direction 595 and vertical/normal direction 590, respectively), and due to the unique markers arranged in both directions, both horizontal and vertical offsets can be detected by the computer vision system by following the exemplary computer vision and calculation methods described herein.

Also shown in FIG. 5B is a close-up view of the field of view of the camera depicting area "a" of the scale 570 and further illustrates how, as further described herein, the system can be configured to determine the specific center-point on the plate that the camera is focused on.

More specifically, the drift value is essentially the coordinates of the middle point 580 in the camera's field of view. In other words, the drift value is the particular location on the measurement scale intersected by the optical reference line expressed in the terms of the particular coordinate system of the two-dimensional measuring scale. The code width 584 can be used for scaling purposes by prior knowledge of its width, in centimeters for example. The exemplary equations representing the coordinates of the midpoint of the camera's field of view (drift value) is shown below. The subscripts denote the units whether in pixels or centimeters.

$$CamX_{cm} = CodeX_{cm} + (dx_{px})\left(\frac{CodeWidth_{cm}}{CodeWidth_{px}}\right)$$

$$CamY_{cm} = CodeX_{cm} + (dy_{px})\left(\frac{CodeWidth_{cm}}{CodeWidth_{px}}\right)$$

dx and dy are the coordinates of the code center 582 with respect to the camera's field of view (image) center. CodeX and CodeY represent the absolute location of the code with respect to the plate. For clarity, plate refers to the two-dimensional area of the measurement scale. CamX/CamY indicates the position of the camera field of view (image) center with respect to the bar-code plate area.

Figure 6C:
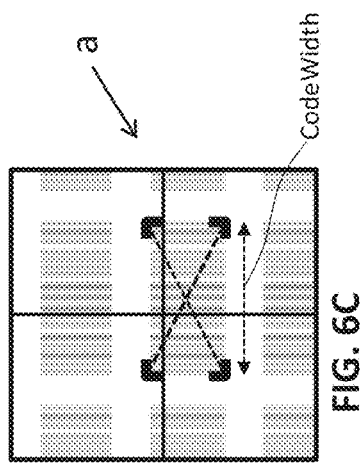
FIG. 6C illustrates a portion of the reference object of FIG. 6B captured and measured in accordance with one or more embodiments of the invention.
Figure 6B:
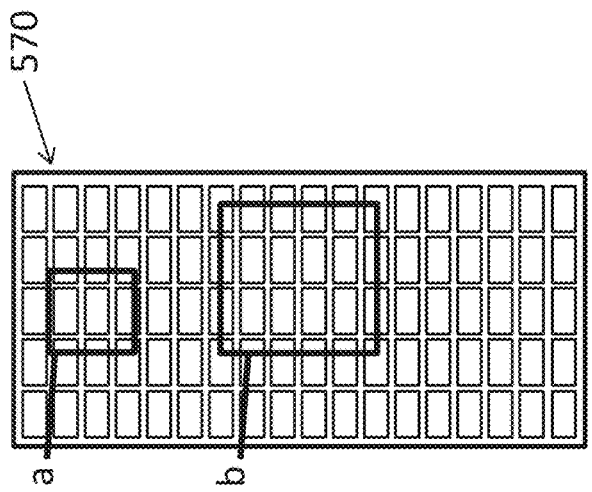
FIG. 6B illustrates the reference object of FIG. 6A and illustrates exemplary areas of the reference object captured using a camera in accordance with one or more embodiments of the invention.
Figure 6A:
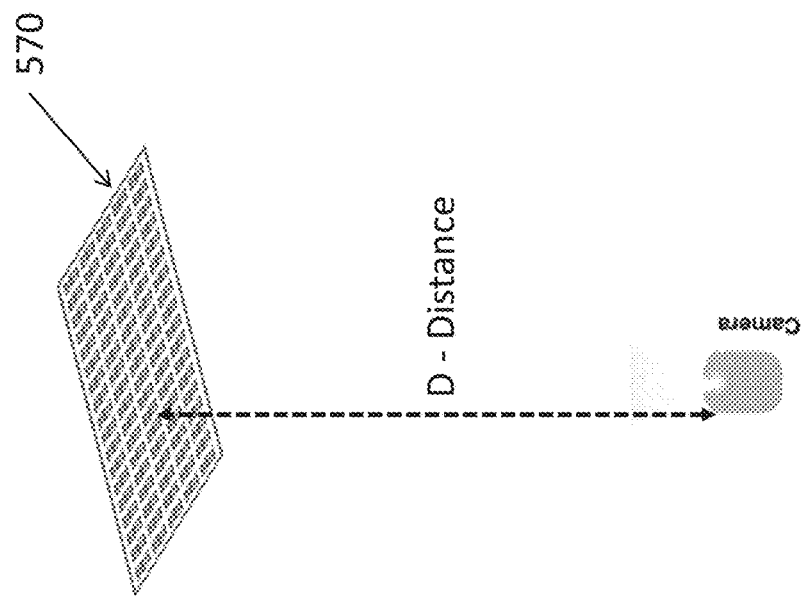
FIG. 6A illustrates an exemplary configuration of a reference object having standardized measurement markings in accordance with one or more embodiments of the invention.

FIG. 6A-6C further illustrate an exemplary approach for determining the distance between the camera (e.g., camera 106) and the measurement scale 570, as discussed in connection with FIGS. 5A-5C, using computer vision techniques. FIG. 6A is a perspective view of the measurement scale 570 provided at a distance D relative to the camera. FIG. 6B is a two-dimensional view of the exemplary scale 570 and identifies field of view areas "a" and "b" imaged by the camera at various stages of an exemplary method for performing ORLM using computer vision. FIG. 6C is a close-up view of the field of view image square "a" shown in FIG. 6B. As can be appreciated, the further the measurement scale 570 is moved away from the camera, the smaller the markers appear to the camera. For instance, this is reflected by the different sized field of view squares identified as "a" and "b" in FIG. 6B. Thus, optical zoom could be increased gradually to keep the marker(s) at a reasonable apparent size in the field of view for robust recognition. Using a certain lens, the distance can be calculated by knowing how big the code width appears at a known distance and known focal length. The relationship between optical magnification, distance, apparent code width is constant as follows:

$$\frac{(CodeWidth_{px})(\text{Distance})}{(OpticalMagnification)} = C$$

The constant can be empirically calculated at a known focal length and distance and then that constant can be applied to find the distance as long as the focal length at that instant is know which could be extracted from the camera's optical zoom:

$$\text{Distance} = \frac{(C)(OpticalMagnification)}{CodeWidth_{px}}$$

Figure 7:
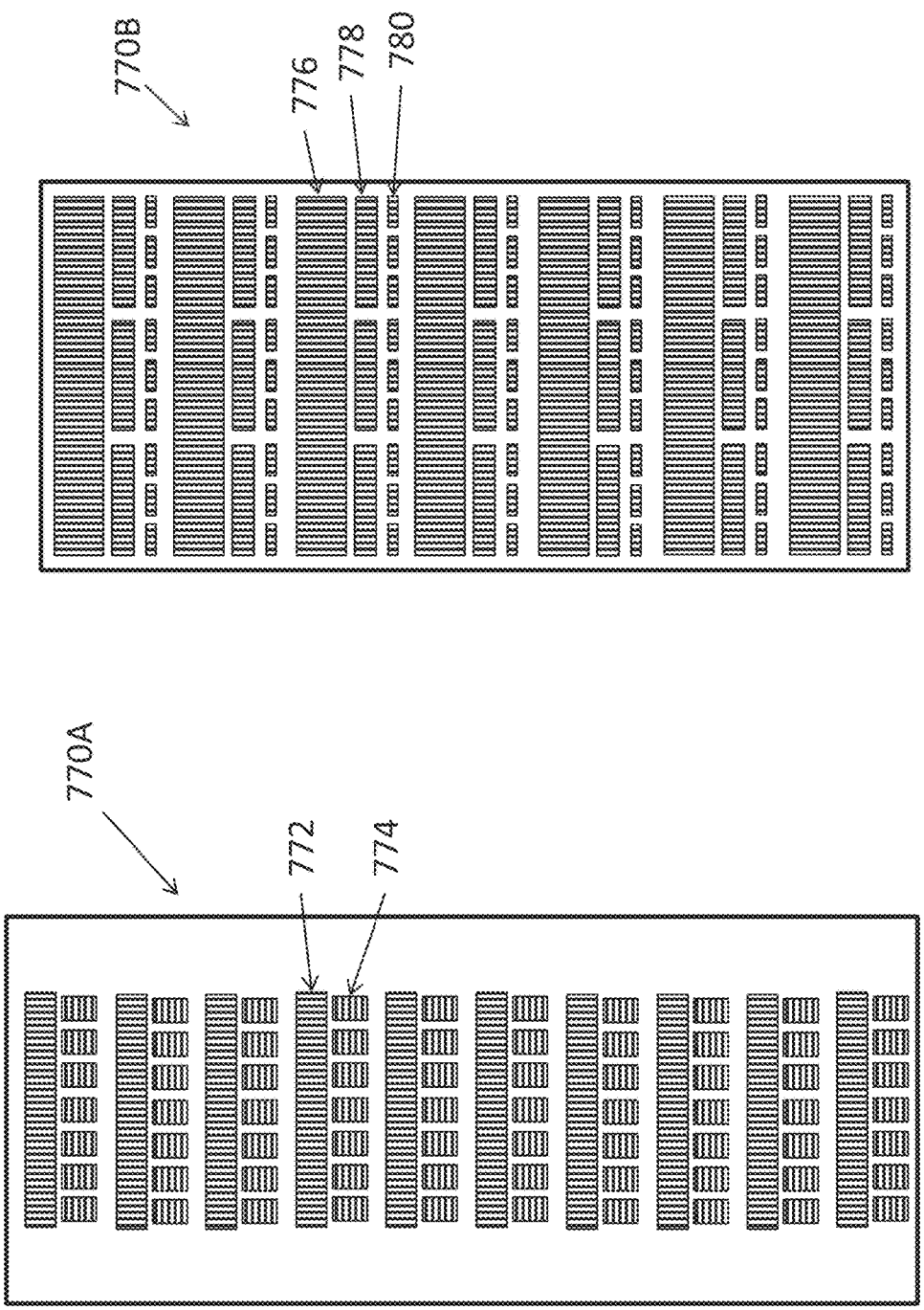
FIG. 7 illustrates an exemplary configuration of a reference object having standardized measurement markings in accordance with one or more embodiments of the invention.

FIG. 7 depicts two additional exemplary measurement scales 770A and 770B that are configured to enable measurement of horizontal drift in addition to drift in the normal direction using the aforementioned exemplary computer vision-based measurement techniques. More specifically, scale 770A comprises both "horizontal" codes 772 and "vertical" code markers 774, which are rotated 90 degrees relative to the codes 772 and are thus referred to as horizontal and vertical codes, and introduces another method to calculate offsets in both x and y directions using code markers oriented in the horizontal and vertical directions respectively, namely, by applying the previously discussed techniques for measuring offset from markers oriented in a first direction and repeating the process for the markers oriented in the other direction.

According to another exemplary implementation, scale 770B comprises nested code markers (fractal design) that allow for positioning to work at various levels of optical zoom. In particular, scale 770B includes a nested arrangement of large scale codes 776, along with medium sized codes 778 and small scale codes 780. So, if the range of available optical zoom is limited whether the target is too close or too far then this exemplary configuration would allow for easier recognition and detection using the appropriately scaled codes.

The particular shape and configuration of the codes can vary from the foregoing exemplary embodiments without departing from the scope of the disclosed invention. For instance, the measurement scale can include square shaped codes, such as QR codes, which are distributed in a grid like configuration to allow for easy and quick x and y offset calculation. By way of further example, the scale can comprise fractal QR code(s) where each black pixel in the code is actually a full QR code by itself, while white pixels are just empty space. In addition, it should be understood that the codes themselves can be machine readable and convey encoded information when read by the computer system. For instance, a given code can be encoded with information such as the given code's center coordinates, size and other such information about the measurement scale that is useable to calculate offset as described herein.

Although the exemplary systems and methods for measuring container volume are described herein in the context of a particular practical application, namely, measuring the volume of large petroleum storage containers having a cylindrical shape, it should be understood that the subject invention is not limited to this exemplary application. For instance, in some implementations, the containers can be oriented such that the central axis extends horizontally relative to the ground. The exemplary techniques disclosed herein are similarly applicable to calibrating the volume of containers having other shapes, for instance, rectangular tanks; however, it can be appreciated that such alternative container shapes can require a different set of known parameters in order to calculate the container volume.

In view of the foregoing it can be appreciated that, in accordance with one or more of the exemplary embodiments of the invention, a system for measuring the volume of a tank comprises:

- a camera mounted at a fixed position relative to a surface of the tank such that its optical sensor is exposed in the vertical direction and the field of view is centered about a vertical reference line.
- a reference object supported by a robotic vehicle, the reference object having a bottom surface and a standardized measurement scale provided on the bottom surface. In particular, the reference object is supported such that the bottom surface extends outwards in a normal direction relative to the wall of the tank and faces the camera such that the digital ruler can be imaged by the camera. Furthermore, the robotic vehicle can be configured to move along the wall in the vertical direction while maintaining at least a portion of the measurement scale within the field of view of the camera device. In addition, the camera can be further configured to capture imagery of the measurement scale as it is moved vertically up and/or down the wall relative to the camera's position.
- a data processing computer in data-communication with at least the camera device, wherein the data processing computer comprises a processor that is configured by executing instructions in the form of one or more software modules to receive and analyze the images that depict the measurement scale and are captured by the camera at respective distances between the camera and the reference object. In particular, the data processing computer using computer vision algorithms is configured to calculate, for each image captured at a respective height on the wall, a respective offset between a respective location on the scale that is determined to intersect the vertical reference line and a reference location on the scale. Moreover, the data processing computer is also configured to calculate a respective radius for the tank at the given height based on the calculated offset and a known radius of the tank that corresponds to the vertical reference line. Finally, the volume of the tank can be measured by the data processing computer using the radius and/or circumference calculations at any number of desired elevations along the height of the tank wall, or optimally integrated into a continual profile of the tank wall at each vertical location. This increase in measurement sensitivity, and the number of data points collected during the measurement process, leads to more accurate volume calculations during tank calibration.

FIG. 8 is a block diagram illustrating an exemplary configuration of hardware and software components of one or more of the computing devices that comprise the computing device 150 described in the present disclosure as performing the various operations relating to controlling operation of the camera 106 and/or the robotic vehicle 104 and analyzing imagery captured therewith to determine the radial offset of a tank wall and calibrating the dimensions of storage tanks.

Components of the computing devices include a processor 940 and a circuit board 950. The circuit board can include a memory 955, a communication interface 960 and a computer readable storage medium 965 that are accessible by the processor 940. The board 950 can also include or be coupled to a power source (not shown) source for powering the computing device.

The processor 940 and/or circuit board 950 can also be coupled to a display 970, for visually outputting information to an operator (user), a user interface 975 for receiving operator inputs, and an audio output 980 for providing audio feedback as would be understood by those in the art. As an example, the processor 940 could emit a visual signal from the display 970, for instance, a computer model depicting the dimensions of a storage container being calibrated. Although the various components are depicted either independent from, or part of the circuit board 950, it can be appreciated that the components can be arranged in various configurations.

The processor 940 serves to execute software instructions that can be loaded into the memory. The processor 940 can be implemented using multiple processors, a multi-processor core, or some other type of processor. The memory 955 is accessible by the processor 940, thereby enabling the processor to receive and execute instructions stored on the memory and/or on the storage. Memory 955 can be implemented using, for example, a random access memory (RAM) or any other suitable volatile or non-volatile computer readable storage medium. In addition, memory 955 can be fixed or removable.

The storage medium 995 can also take various forms, depending on the particular implementation. For example, storage medium 965 can contain one or more components or devices such as a hard drive, a flash memory, a rewritable optical disk, a rewritable magnetic tape, or some combination of the above. The storage medium 965 also can be fixed or removable or remote such as cloud based data storage systems (remote memory or storage configuration not shown). The storage, for example, can be used to maintain a database 980, which stores information relating to the capture of measurement data, the dimensional calibration of respective structures and or data used or generated while carrying out operations and implementing aspects of the systems and methods disclosed herein.

One or more software modules 985 are encoded in the memory 955 and/or storage medium 965. The software modules can comprise one or more software programs or applications having computer program code or a set of instructions executed in the processor 940. Such computer program code or instructions for carrying out operations and implementing aspects of the systems and methods disclosed herein can be written in any combination of one or more programming languages. While software modules are stored locally in storage 965 or memory 955 and execute locally in the processor 940, the processor can interact with remotely-based computing platform via communication interface 960, and via a local or wide area network to perform calculations or analysis.

During execution of the software modules 985, the processor 940 is configured to perform the various operations of the measuring systems described herein, including without limitation, the previously described steps for performing ORLM using computer vision techniques. The software modules can include code for implementing the aforementioned steps and other steps and actions described herein, for example and without limitation: an image capture module 970, which configures the computing device 150 to operate the camera 106 (not shown), capture imagery using the camera and adjust operational settings relating to camera zoom and the like; a robotic vehicle control module 972, which configures the processor to control the movement of the vehicle 104 (not shown) on the storage container during image capture; an image analysis module 974, which configures the processor to analyze the captured imagery using a computer vision algorithm configured to calculate the offset of the reference object in one or more directions relative to a reference (e.g., calculate a radial offset distance between the wall and the vertical reference line from imagery of the measurement scale captured at respective heights on the wall); a dimension analysis module 976, which configures the processor to calculate and model the geometry of a container based on the measured offsets calculated from the imagery using computer; and a communication module 978, which configures the processor to communicate with remote devices over a communication connection such as a communication network or any wired or wireless electronic communication connection.

The program code of the software modules 985 and one or more of the non-transitory computer readable storage devices (such as the memory 955 and/or the storage 965) can form a computer program product that can be manufactured and/or distributed in accordance with the present disclosure, as is known to those of ordinary skill in the art.

At this juncture, it should be noted that although much of the foregoing description has been directed to measuring devices and systems and methods for calibration of the volume of storage containers, the systems and methods disclosed herein can be similarly deployed and/or implemented in scenarios, situations, and settings far beyond the referenced scenarios.

It should be appreciated that more or fewer operations can be performed than shown in the figures and described. These operations can also be performed in a different order than those described. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a system and a computer implemented method, computer system, and computer program product for calibration of the volume of storage containers. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present disclosure, which is set forth in the following claims.

What is claimed is:

1. A system for measuring the volume of a tank, the system comprising:
    a camera having an optical sensor, wherein the camera's optical axis is parallel to a surface of the tank and thereby defines an optical reference line extending parallel to the surface of the tank;
    a robotic vehicle selectively moveable along the surface of the tank and configured to be remotely controlled by an operator, the robotic vehicle comprising:
        a reference object having a standardized measurement scale provided on a surface of the reference object and facing the camera; and
    a data processor that communicates with the camera and receives images of the measurement scale captured by the camera at respective elevations on the tank, the data processor comprising a processor and a computer readable non-transitory storage medium storing executable instructions in the form of one or more software modules that, when executed by the processor, configure the processor to:
        determine, from the measurement scale depicted in the images, positions of the reference object relative to the optical reference line as the robotic vehicle moves along the surface of the tank, and
        calculate the volume of at least a portion of the tank based at least partially on the determined positions.

2. The system of claim 1, wherein the surface of the tank is a tank wall, and wherein the optical axis defining the optical reference line extends away from the camera in a vertical direction that is parallel to the tank wall and orthogonal to a normal direction of the tank wall.

3. The system of claim 1, wherein the software modules configure the processor to determine the positions of the reference object by:
    analyzing the images of the measurement scale captured by the camera using computer-vision algorithms; and
    for each respective image, respectively,
        determining a location on the measurement scale that intersects with the vertical reference line, and
        calculating an offset distance in one or more directions between the location and a known reference location on the measurement scale.

4. The system of claim 3, wherein the processor is further configured to calculate, for each respective image, a size parameter of the tank based on the calculated offset distance and a known geometry of the tank corresponding to the known reference location on the measurement scale, wherein the size parameter is one or more of a radius and a circumference.

5. The system of claim 4, wherein the processor is further configured to calculate the volume of at least the portion of the tank, by the computing device based on the size parameters calculated from a plurality of the images.

6. The system of claim 3, wherein the processor, using computer-vision algorithms, is further configured to calculate, for each respective image, the respective elevation of the reference object as a function of the camera's optical parameters and the measurement scale depicted in the respective image.

7. The system of claim 6, the camera further comprising an adjustable optical zoom lens, wherein the data processor bases its calculations at least partially on a camera zoom parameter measured by the camera for the images, respectively.

8. The system of claim 7, wherein the camera and the associated data processor using a computer vision algorithm are configured to adjust the camera's optical zoom lens to maintain at least a portion of the measurement scale at a suitable size in the images captured by the camera as the robotic vehicle moves along the surface of the tank and record the camera zoom parameter associated with the images, respectively; and
wherein the processor is configured to calculate the respective elevation of the reference object for the respective image based on the associated camera zoom parameter and a size of at least a portion of the measurement scale depicted in the respective image.

9. The system of claim 2, wherein the robotic vehicle has an elevation sensor for measuring the elevation of the robotic vehicle, and wherein the elevation is relative to one or more of the bottom of the tank and the camera.

10. The system of claim 1, wherein the surface of the tank is a tank bottom, and the camera is oriented such that the optical axis and optical reference line is parallel to the tank bottom.

11. The system of claim 1, wherein the camera is mounted on a tripod to increase stability and is leveled on three axes to increase accuracy.

12. The system of claim 1, wherein the measurement scale is a two-dimensional area having a length and width and comprises a pattern of marker objects provided at known positions within the two-dimensional area.

13. The system of claim 12, wherein the processor is configured to determine the location on the measurement scale that intersects with the vertical reference line by measuring a relative position of one or more of the marker objects relative to the vertical reference line using a computer vision algorithm, and wherein the offset distance is calculated based on the measured relative position and the known respective position for the one or more marker objects.

14. The system of claim 12, wherein the marker objects comprise one or more of distinguishable shapes and machine-readable codes.

15. The system of claim 12, wherein the marker objects are arranged to define a pattern that extends in one or more of a lengthwise direction and a horizontal direction.

16. The system of claim 12, wherein individual marker objects define a respective pattern that extends in one or more of a lengthwise direction and a horizontal direction.

17. A method for measuring the volume of a tank, comprising:
providing a camera, wherein the camera's optical axis is parallel to a surface of the tank and thereby defines an optical reference line extending parallel to the surface of the tank
urging a robotic vehicle along a surface of the tank, the robotic vehicle comprising a reference object having a standardized measurement scale provided on a surface of the reference object and facing the camera;
capturing, using the camera, images of the measurement scale as the robotic vehicle is moved along the surface of the tank;
monitoring, with a data processor that communicates with the camera and receives the images, changes of position of where the reference line intersects the standardized measurement scale, wherein the data processor comprises a computer readable non-transitory storage medium having executable instructions stored therein and a processor that is configured by executing the instructions;
estimating, with the data processor, a contour of the surface of the tank based on the step of monitoring; and
analyzing, with the data processor, the contour data to calculate a volume of the tank.

18. The method of claim 17, further comprising:
determining, by the data processor from at least a first image, a reference location on the measurement scale that intersects with the vertical reference line, wherein the first image is captured at a given elevation of the reference object on the tank surface; and
wherein the step of monitoring changes of position of where the reference line intersects the standardized measurement scale comprises, for each of a plurality of images:
determining, with the data processor from a given image, a location on the scale that intersects with the vertical reference line, and
calculating, with the data processor, a difference between the determined location and the reference location.

19. The method of claim 18, wherein the measurement scale comprises a pattern of marker objects provided at known positions over a two-dimensional surface area of the measurement scale, and wherein the step of determining the location on the scale that intersects with the vertical reference line for the given image comprises:
measuring, by the data processor using a computer vision algorithm, a position of one or more of the marker objects in the given image relative to the vertical reference line, and
calculating the location based on the known positions of the one or more marker objects.

\* \* \* \* \*